United States Patent [19]

Beatty et al.

[11] Patent Number: 5,403,618
[45] Date of Patent: Apr. 4, 1995

[54] PRODUCTION OF NON-WETTABLE REFRACTORIES

[75] Inventors: Christopher Beatty, Cortland; Roger Jones, Youngstown, both of Ohio

[73] Assignee: Fireline, Inc., Youngstown, Ohio

[21] Appl. No.: 122,238

[22] Filed: Sep. 16, 1993

[51] Int. Cl.⁶ .......................... B05D 5/00; B05D 1/18
[52] U.S. Cl. ..................... 427/226; 427/299; 427/337; 427/399; 427/430
[58] Field of Search ...................... 427/399, 430.1, 299, 427/337, 226

[56] References Cited

U.S. PATENT DOCUMENTS

| | | | |
|---|---|---|---|
| 3,535,154 | 10/1970 | Meyer-Simon et al. | 117/123 |
| 4,492,721 | 1/1985 | Joosten et al. | 427/226 |
| 4,681,819 | 7/1987 | Gnyra | 427/226 |
| 5,033,721 | 7/1991 | Gnyra | 266/280 |
| 5,164,233 | 11/1992 | Sonuparlak et al. | 427/399 |
| 5,221,558 | 6/1993 | Sonuparlak et al. | 427/399 |

OTHER PUBLICATIONS

The Condensed Chemical Dictionary, 10th Edition, copyright 1981, pp. 544, 634.

*Primary Examiner*—Shrive Beck
*Assistant Examiner*—Brian K. Talbot
*Attorney, Agent, or Firm*—Frost & Jacobs

[57] ABSTRACT

A method for the production of refractory products, non-reactive with molten aluminum, other molten metals and with molten alloys is provided. A formed refractory product is made non-reactive to molten metals/alloys by impregnating the product with a solution containing fluosilicic acid, fluoroboric acid, hydrogen fluoride and mixtures thereof, and subsequent heating of the impregnated product to cause the formation of non-reactive surface.

6 Claims, No Drawings

PRODUCTION OF NON-WETTABLE REFRACTORIES

The present invention provides a method for production of a refractory product which is non-wettable (not reactive with) molten metals and alloys. More specifically, this invention provides a method for the production of a refractory product which is non-wettable to molten aluminum. Non-wettable refractories produced by the methods of the present invention are also included within the scope of this invention.

BACKGROUND OF THE INVENTION

In the aluminum industry and in the production of other metals and alloys, refractory products are frequently employed. In use, typically the refractories are in direct contact with a particular metal or alloy manufactured in its molten state.

Silica, in some form or the other, is often present in refractory articles and it is well known that aluminum, magnesium and lithium alloys with magnesium (especially in their molten state) are extremely aggressive in their attack of silica-based refractories. Solutions have been proposed in the past to this problem of rapid deterioration of refractory articles due to attack by molten metals and alloys. Some of these solutions will now be discussed in greater detail below, to highlight the differences between, and inadequacies of these techniques in comparison with the method of the present invention.

U.S. Pat. No. 4,681,81 9 ("the '819 patent") provides a method for treating a formed refractory article for use in contact with molten aluminum metal, to protect against attack by the metal on the surface of the article. The method of the '819 patent comprises impregnating the surface of the formed refractory article with an aqueous solution of magnesium fluosilicate for establishing thereupon a magnesium fluosilicate deposit capable of providing, upon thermal decomposition, fluoride values of a type and in an amount effective to enhance the resistance of the surface portion to attack by molten aluminum, and then heating at least the impregnated surface portion to decompose the magnesium fluosilicate to produce, in situ, the fluoride values. Magnesium fluosilicate is described as embracing $MgSiF_6.6H_2O$ as well as anhydrous $MgSiF_6$.

The '819 patent further makes it clear that the fluoride values obtained by this process ordinarily or typically comprise the decomposition product $MgF_2$. At column 6, lines 48 through column 7, line 2, the '819 patent describes in detail the protective fluoride values obtained due to use of $MgSiF_6$ or its solution. In addition to $MgF_2$, the '819 patent reveals that $SiF_4$ can be another decomposition product which would make up the fluoride values. The fluoride values may also comprise calcium fluoride, namely $CaF_2$. In case of situations wherein the article treated is a fibrous aluminum silicate, the fluoride values may also include $SiO_4(F,OH)_2$. Importantly, the '819 patent does not eliminate the formation of skulls on the formed refractory articles, upon exposure to molten aluminum or to other molten metals or alloys.

The present invention, instead of using complex and expensive materials such as $MgSiF_6$ and other materials with similar properties, structure and elemental composition which would in fact produce skulls as produced by $MgSiF_6$, and introduce unwanted materials such as boron or silica into the protective material formed on the refractory article, uses hydrofluoric acid solutions for the same purpose. The use of hydrofluoric acid makes the process of the present invention much less expensive than if one were to use $MgSiF_6$ or its solution.

U.S. Pat. No. 5,033,721 is assigned to the owner of the '819 patent. U.S. Pat. No. 5,033,721 relates to insulating light-weight refractory materials. The principal method of U.S. Pat. No. 5,033,721 involves compositions including ceramic fibers, wollastonite powder, aqueous colloidal silica, unmilled vermiculite for forming refractodes. The compositions of U.S. Pat. No. 5,033,721 can also be improved for better resistance to chemical attack by treatment in accordance with the '819 patent with $MgSiF_6$ or its solution. U.S. Pat. No. 5,033,721 and its use of $MgSiF_6$ presents the same problems faced by refractory articles treated with $MgSiF_6$ in the '819 patent.

U.S. Pat. No. 3,535, 154 ("the '154 patent"), is directed to the protection of substrates different from those which would be protected by the present invention. The '154 patent is directed to the protection of silicon nitride molded bodies, by dipping the bodies in an aqueous alkali metal, alkaline earth metal or heavy metal salt and then by calcining in an oxygen containing gas at a temperature of 1,200 to 1,500 degrees centigrade.

U.S. Pat. No. 4,492,721 ("the '721 patent"), provides a method of providing magnesium fluoride layers. These layers are provided for forming an antireflective layer and not for the purpose of forming an aluminum nonwettable refractory. The solutions utilized in the '721 patent are organic compounds and not inorganic compounds. The '721 patent is thus much closer to the '819 patent and to U.S. Pat. No. 5,033,721 than to the method of the present invention.

The present invention provides a method of making formed refractory articles non-wettable to molten aluminum, other molten metals and other molten alloys, by contacting the formed refractory article with a solution of hydrofluoric acid for a predetermined amount of time and drying at a temperature above 200° centigrade to react the fluorine in the hydrogen fluoride with the refractory and drive off any free fluorine.

SUMMARY OF THE INVENTION

In accordance with the present invention there is provided a method for making a formed refractory article non-wettable to molten aluminum, to other molten metals and to molten alloys, comprising the steps of: contacting at least a part of said formed article with a hydrofluoric acid solution for a predetermined amount of time, so as not to allow said hydrofluoric acid solution to attack said refractory; and drying said contacted article in a well ventilated oven at a temperature above 200° centigrade so as to react the fluorine in the hydrogen fluoride with the refractory and to drive off any free fluorine.

DETAILED DESCRIPTION OF THE INVENTION

The invention will now be described as embodied in methods of treating formed refractory articles to make the refractory articles nonwettable to molten aluminum, to other molten metals and to molten alloys.

The hydrofluoric acid solutions of the present invention offer the following advantages when compared to the $MgSiF_6$ solution disclosed in the '819 patent or other similar solutions such as for example, solutions of fluosilicic acid $H_2SiF_6$ or fluoroboric acid $HBF_4$: (1) the hydrofluoric acid solutions do not introduce any unwanted or unneeded materials such as sodium, magnesium, boron or silica into the refractory, the hydrogen in the hydrofluoric acid simply volatilizes; (2) the hydrofluoric acid solutions are much less expensive than the other solutions, described above; and (3) the hydrofluoric acid impregnated refractories showed no signs of reaction or wetting by molten aluminum after several 24 hour cycles at 760° C. The '819 patent on the other hand makes it amply clear that skull formation is reduced but not completely eliminated.

Several substrate compositions were impregnated with the hydrofluoric acid solutions including: (1) clay bonded fused silica which is a composition of glazed refractory and fused silica grogs; (2) clay bonded alumina which is a composition of refractory clays and alumina grog; (3) other clay bonded compositions which are compositions of clay and other refractory grogs; and (4) vacuum formed ceramic fibers which are compositions of alumina silicate fibers and refractory fillers.

Prior to treatment by the method of the present invention, the refractory article is already formed into its final shape and dimensions for use in a molten metal treating operation. The formation of these articles is by conventional methods. In the method of the present invention, a formed refractory article is contacted with a solution of hydrofluoric acid for a predetermined amount of time, after which the contacted article is heated and dried in a well-ventilated oven, at a temperature of above 200° C. in order to react the fluorine with the refractory and to drive off any free fluorine.

Various techniques of contacting the formed refractory article with the hydrofluoric acid solution can be utilized for the practice of the present invention. For example, the hydrofluoric acid solution may be brushed on to the formed refractory article or the refractory article may be dipped into hydrogen fluoride solution. Caution must be exercised when impregnating formed refractory articles with hydrofluoric acid solution, because if the part is immersed in the hydrofluoric acid solution for too long, the acid will begin to attack the refractory. Two different solutions of hydrofluoric acid are used for the practice of this invention: a 25% hydrofluoric acid solution with water and a 12.5% hydrofluoric acid solution with water. If the article is dipped, the amount of time the part is submerged into the hydrofluoric acid solution determines the degree of impregnation. A submersion of amount 10–20 seconds has been found to be adequate for a refractory article with a 25% porosity level.

The hydrofluoric acid solutions of the present invention are prepared simply by mixing hydrofluoric acid, HF (CAS No. 7664-39-3), with the appropriate amount of water. Upon treatment with the hydrofluoric acid solutions, it is seen in experiments that the fluoride impregnated refractory shows no signs of reaction or wetting by molten aluminum after several 24 hour cycles at 760° centigrade. Other metals which have been tested include 4% copper steel (2024) and aluminum-zinc alloys. Initial tests have shown that the impregnated refractory may also resist chemical attack by copper and brass alloys to some extent.

Thus it is apparent that there have been provided, in accordance with the invention, a method of making formed refractory articles non-wettable to aluminum, other molten metals and other molten alloys, which fully satisfies the aspects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and broad scope of the appended claims.

We claim:

1. A method for making a formed refractory article non-wettable to molten aluminum and to molten alloys of aluminum, comprising the steps of:

contacting at least a part of said formed refractory article with a solution consisting essentially of hydrofluoric acid and water for an appropriate amount of time, so as not to allow said hydrofluoric acid solution to attack said formed refractory article; and drying said formed refractory article in a well ventilated oven at a temperature above 200° centigrade so as to react the fluorine in the hydrofluoric acid with the refractory and to drive off any free fluorine.

2. The method of claim 1, wherein said contacting is achieved by brushing said formed refractory article with said hydrofluoric acid solution.

3. The method of claim 1, wherein said contacting is achieved by dipping said formed refractory article in said hydrofluoric acid solution.

4. The method of claim 1, wherein said hydrofluoric acid solution is a 12.5% solution in water.

5. The method of claim 1, wherein said hydrofluoric acid solution is a 25% solution in water.

6. The method of claim wherein said formed refractory article is selected from the group consisting of clay bonded fused silica, clay bonded alumina, other clay bonded compositions of clay and refractory grogs other than silica and alumina and vacuum formed ceramic fibers.

* * * * *